Patented Mar. 3, 1936

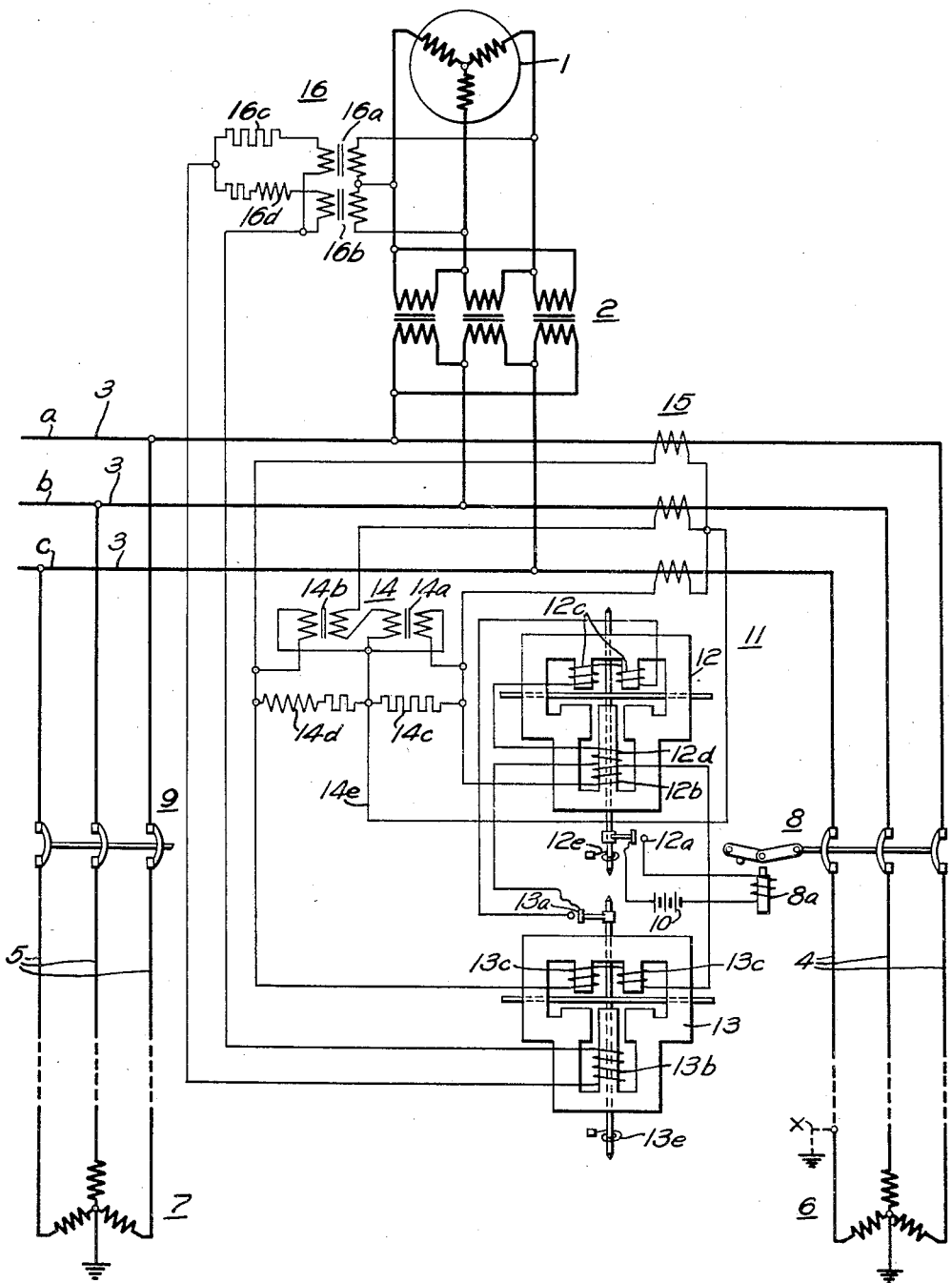

2,032,997

UNITED STATES PATENT OFFICE 2,032,997

DIRECTIONAL GROUND PROTECTION

William A. Lewis, Jr., Wilkinsburg, Pa., and Roy M. Smith, North Arlington, N. J., assignors to Westinghouse Electric & Manufacturing Company, East Pittsburgh, Pa., a corporation of Pennsylvania Application December 28, 1933, Serial No. 704,308

5 Claims. (Cl. 175—294)

Our invention relates to protective apparatus for electric circuits and particularly to directional ground relays for polyphase alternating current transmission and distribution circuits. In one aspect our invention relates to relay apparatus of the type based upon the principles of symmetrical coordinates as explained, for example, in "Symmetrical Components" by C. F. Wagner and R. D. Evans, McGraw-Hill Book Co., 1933.

In the protection of polyphase circuits against ground faults it has heretofore been the practice to provide ground relays which are energized in accordance with the residual or zero sequence quantities of the protected circuit. Where directional ground protection is necessary, a power directional element responsive to zero sequence power and an overcurrent element responsive to zero sequence current are usually provided. The potential winding of the power directional element of this combination may be energized in either of two ways, dependent upon the type of power apparatus available at the point where the relay is applied. If a polyphase transformer or bank of transformers having star connected high voltage windings and delta connected low voltage windings is available, the equivalent of zero sequence voltage may be obtained by a single current transformer connected in the neutral ground conductor of the high voltage windings. Similar connections may be made with zig-zag connected transformer secondary windings or other transformer arrangements having a ground connection on the high voltage side. If no such transformer apparatus is available, three insulating potential transformers are required to obtain the zero sequence voltage.

It is an object of our invention to provide a novel directional ground relay for three phase circuits which shall require not more than two high voltage insulating potential transformers, and which may be used without high voltage potential transformers if power transformers connected in any usual manner are available.

Another object of our invention is to provide a novel directional ground relay which shall respond to unsymmetrical ground faults and also to unbalanced phase-to-phase faults.

Other objects of our invention will become evident from the following detailed description taken in conjunction with the accompanying drawing, in which the single figure is a diagrammatic view of a relay embodying our invention, as applied to a high voltage power system.

Referring to the figure in detail, a generator 1 is connected by means of any suitable transformer apparatus, shown as a delta-delta connected bank of transformers 2 to a high voltage bus 3. A pair of transmission circuits or high voltage feeders 4 and 5 are connected to the bus 3 by means of a pair of circuit breakers 8 and 9, respectively. The feeders 4 and 5 are connected to the receiving apparatus to which power is to be supplied, indicated diagrammatically as star connected grounded-neutral windings 6 and 7, respectively.

The circuit breakers 8 and 9 may be of any suitable high voltage type having manual or automatic reclosing apparatus (not shown) and any suitable tripping apparatus. The tripping apparatus for the circuit breaker 8 is indicated diagrammatically as a trip coil 8a, connected in a circuit which includes a battery 10 and the contact members 12a of a directional ground relay 11 constructed in accordance with our invention. The tripping apparatus for the circuit breaker 9, which may be similar to that for the circuit breaker 8, has for simplicity been omitted.

The relay 11 comprises an overcurrent element 12 and a power directional element 13 which may be mounted in a single case in the usual manner. For purposes of illustration we have shown the elements 12 and 13 as of the induction disc type suitable for use with comparatively low speed circuit breaker apparatus, but it will be obvious that the invention is equally applicable to high-speed circuit breaker apparatus, and when so applied, the relay elements 12 and 13 would be of suitable high-speed construction known in the art.

The overcurrent element 12, in the form shown, is of the usual induction type having a lower pole winding 12b and a pair of upper pole windings 12c mounted upon angularly displaced pole members in a manner well understood in the art. The power directional element 13 may be of similar construction, having a potential winding 13b and a pair of current windings 13c similarly arranged upon angularly displaced pole members. A pair of biasing springs 12e and 13e are provided for normally maintaining the contact members 12a and 13a in open circuit positions. Various other elements of the relay 11 which are known in the art, but which are not necessary to an understanding of our invention have for simplicity been omitted from the drawing and description.

The upper pole windings 12c of the overcurrent element 12 are normally open-circuited but may be connected in a local circuit with an auxiliary winding 12d, by means of the contact members 13a of the directional element 13. The lower pole winding 12b of the overcurrent element 12 is connected in series with the current windings 13c of the directional element 13, to the output terminals of a negative phase-sequence current filter 14, to be energized in accordance with the negative phase-sequence current of the circuit 4.

The current filter 14 may be of any suitable type but is preferably constructed in accordance with the principles explained in U. S. Patent No. 2,000,767, issued May 7, 1935, upon a copending sole application of W. A. Lewis, Serial No. 704,309, filed Dec. 28, 1933, and assigned to the Westinghouse Electric & Manufacturing Company. The filter 14 comprises a pair of 5:5 ratio low voltage current transformers 14a and 14b having their primary windings connected in series to the junction of a resistor 14c and a reactor 14d. The secondary windings of the current transformer 14a and 14b are connected in reversed open V across the resistor 14c and the reactor 14d respectively. The input terminals of the filter 14 are connected to the star-connected secondary windings of a bank of insulating current transformers 15 in the manner shown in the figure. A neutral return conductor 14e is connected between the junction point of resistor 14c and reactor 14d and the star point of the secondary windings of the current transformers 15.

The impedance of the reactor 14d is equal to the impedance of the resistor 14c rotated through a phase angle of 60° in the lagging direction. For maximum efficiency of the filter 14, as explained in the copending sole application of W. A. Lewis, mentioned above, the absolute impedance of the resistor 14c and reactor 14d is made equal to .577 or $$\frac{1}{\sqrt{3}}$$

times the absolute impedance of the current windings 13c and lower pole winding 12b in series.

The potential winding 13b of the power directional element 13 is connected to a negative phase-sequence voltage filter 16 to be energized in accordance with the negative phase-sequence voltage of the generator 1. The voltage filter 16 comprises a pair of insulating potential transformers 16a and 16b having their primary windings connected in open V to the terminal of generator 1 and their secondary windings connected in parallel circuits which include a resistor 16c and a reactor 16d, respectively. The impedance of the parallel circuit which includes the reactor 16d is equal to the impedance of the parallel circuit which includes the resistor 16c, rotated through a phase angle of 60° in the lagging direction. For maximum efficiency of the filter 16, the absolute impedances of the resistor 16c and reactor 16d are made equal to 1.732 or $$\sqrt{3}$$

times the absolute impedance of the potential winding 12b, as explained in the above-mentioned sole application of W. A. Lewis.

Assuming that the normal phase relationship of star voltages and currents in the bus 3 is as indicated by the reference characters $a$, $b$ and $c$, it may be shown that the output voltage of the voltage filter 16 is proportional to the negative sequence voltage of the generator 1, and the current in the windings 13c and 12b is proportional to the negative sequence current of the high voltage circuit 4. It will, therefore, be apparent that the directional element 13 is energized in accordance with a vector product of negative sequence voltage and negative sequence current. By selecting a potential winding 13b of suitable impedance phase angle as compared with the phase angle of the current windings 13c, the directional element 13 may be made to respond to negative sequence real power, negative sequence reactive power or to any intermediate negative sequence power product. In order to obtain negative sequence real power response of the directional element 13, the phase angle of the potential winding 13b is made 60° greater than the phase angle of the current winding 13c. The 60° shift of potential pole flux together with a 30° displacement resulting from the constants of the filters 14 and 16 gives a 90° displacement of potential pole and current pole fluxes, and therefore, maximum torque of the directional element 13 when the negative sequence current of the feeder 4 is in phase with the negative sequence voltage of the generator 1.

In many applications, it is desirable to cause the power directional element 13 to respond to a lagging negative sequence power product rather than real negative sequence power. This may be accomplished by choosing a potential winding 13b having a phase of less than 60° greater than the phase angle of the current windings 13c, or by inserting external resistance in series with the potential winding 13b.

The operation of the apparatus shown in the figure may be set forth as follows: It is assumed that initially the generator 1 is in operation, the circuit breakers 8 and 9 are closed, as shown in the figure, and that power is flowing from the generator 1 through the high voltage circuits 4 and 5 to the load devices 6 and 7. If the power flow in the circuits 4 and 5 is balanced, no negative sequence power flows in the system. If there is an unbalance in the polyphase power flow in either circuit 4 or 5, negative sequence power flows from the unbalanced load device 6 or 7 to the generator 1 to be absorbed in the generator damper winding (not shown) in well known manner. The magnitude of this negative sequence power flow is small as compared with that which may flow under fault conditions, and will be assumed as less than the minimum value to which the directional element 13 is adjusted to respond.

If an unbalanced ground fault occurs at point $x$ on the circuit 4, negative sequence power of large magnitude flows from the fault in both directions to any apparatus having negative sequence admittance connected to the system. The flow of this power to the generator 1 and load device 7 causes the directional element 13 to close. The high negative sequence current flow under these conditions causes the overcurrent element 12 to close, and thereby trip open the circuit breaker 8.

If an unsymmetrical fault occurs on the high voltage circuit 5, the direction of negative sequence power flow at the relaying point is opposite to that described above, and the directional element 13 accordingly remains open.

It will be apparent that negative sequence power and current flow occur under the following fault conditions: single phase-to-ground faults, double phase-to-ground faults at the same location, phase-to-phase faults, and three-phase faults where the fault impedances are unsymmetrical. It will, therefore, be seen that a ground relay constructed in accordance with our invention operates in response to the same types of faults as a residual type ground relay, and in addition operates in response to phase-to-phase faults.

In the system described above, the voltage of the generator 1 may be of medium value such as 6600 or 13200 volts, whereas the voltage of the bus 3 and circuits 4 and 5 may be a transmission voltage, such as 66 kv. The voltage filter 16 is connected on the low voltage side of the transformer bank 2 in order to avoid the use of high voltage insulating potential transformers. As negative sequence voltage is transmitted by delta-star, star-star, open V or Scott connected transformer windings, the connection shown may be used where power transformer banks connected in any usual manner are available. The phase shift of voltages in star-delta transformer apparatus must, of course, be considered in applying the directional element to such apparatus.

We do not intend that the present invention shall be restricted to the specific structural details, arrangement of parts or circuit connections herein set forth, as various modifications thereof may be effected without departing from the spirit and scope of our invention. We desire, therefore, that only such limitations shall be imposed as are indicated in the appended claims.

We claim as our invention:

1. In a directional ground relay for a polyphase alternating-current circuit, a directional element, an overcurrent element, energizing means for said elements including means for energizing said directional element in accordance with a vector product of a current condition derived from a plurality of phases of said circuit and a voltage condition derived from a plurality of phases of said circuit, said vector product having a characteristic dependent upon the presence of unbalanced faults in a predetermined direction on said circuit, said energizing means including means for energizing said overcurrent element in accordance with the negative sequence current of said circuit, and connections between said elements for effecting a control operation only when an unbalanced fault condition exists in a predetermined direction and the negative sequence current of said circuit exceeds a predetermined value.

2. In protective apparatus for a polyphase alternating-current circuit, a circuit breaker, a directional relay element, an overcurrent relay element, energizing means for said relay elements including means for energizing said directional relay element in accordance with a vector product of a current condition derived from a plurality of phases of said circuit and a voltage condition derived from a plurality of phases of said circuit, said vector product having a characteristic dependent upon the presence of unbalanced faults in a predetermined direction on said circuit, said energizing means including means for energizing said overcurrent relay element in accordance with the negative sequence current of said circuit, and means effective upon operation of both of said relay elements for causing said circuit breaker to open.

3. In a directional ground relay for a polyphase alternating-current circuit, a directional element, an overcurrent element, energizing means for said elements including means for energizing said directional element in accordance with a vector product of negative sequence current and negative sequence voltage of said circuit, said energizing means including means for energizing said overcurrent element in accordance with the negative sequence current of said circuit, and connections between said elements for effecting a control operation only when said vector product is in a predetermined directional condition and the negative sequence current of said circuit exceeds a predetermined value.

4. In protective apparatus for a polyphase alternating-current circuit, a circuit breaker, a directional relay element, an overcurrent relay element, energizing means for said relay elements including means for energizing said directional relay element in accordance with the vector direction of unbalanced current flow of said circuit exclusive of the zero sequence component, said energizing means including means for energizing said overcurrent element in accordance with the magnitude of said unbalanced current exclusive of the zero sequence component, and means effective upon operation of both of said elements for causing said circuit breaker to open.

5. In an alternating-current system of transmission and distribution having a first polyphase power circuit and a second polyphase power circuit connected by power transformer apparatus, said transformer apparatus having polyphase windings connected to pass positive sequence power components and prevent the passage of zero sequence power components, ground fault protective means for said first circuit including an overcurrent element, a directional element having potential coil means and current coil means, and energizing means for said elements including means for energizing said potential coil means in accordance with negative sequence voltage derived from said second circuit and means for energizing said current coil means in accordance with negative sequence current derived from one of said circuits, said energizing means including means for energizing said overcurrent element in accordance with negative sequence current derived from one of said circuits.

WILLIAM A. LEWIS, Jr.
ROY M. SMITH.